United States Patent
Halliday et al.

(10) Patent No.: US 9,254,042 B2
(45) Date of Patent: *Feb. 9, 2016

(54) BACKREST MEMBER INCLUDING AN ADJUSTABLE PLATFORM FOR USE WITH A CHAIR

(71) Applicants: Michael V. Halliday, Salem, UT (US); Steven R. Halliday, Salem, UT (US)

(72) Inventors: Michael V. Halliday, Salem, UT (US); Steven R. Halliday, Salem, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/293,154

(22) Filed: Jun. 2, 2014

(65) Prior Publication Data
US 2014/0300157 A1    Oct. 9, 2014

Related U.S. Application Data

(63) Continuation-in-part of application No. 13/530,926, filed on Jun. 22, 2012, now Pat. No. 8,740,303.

(51) Int. Cl.
*A47C 3/026* (2006.01)
*A47C 7/14* (2006.01)
*A47C 7/46* (2006.01)
*A47C 16/02* (2006.01)
*B60N 2/22* (2006.01)
*A47C 31/12* (2006.01)
*A47C 7/42* (2006.01)

(52) U.S. Cl.
CPC . *A47C 7/46* (2013.01); *A47C 7/425* (2013.01); *A47C 7/462* (2013.01); *A47C 31/126* (2013.01); *B60N 2/22* (2013.01)

(58) Field of Classification Search
USPC .............. 297/284.1, 284.3, 284.4, 423.39, 297/423.41, 452.3, 452.31, 452.32, 452.33, 297/452.34
See application file for complete search history.

(56) References Cited

U.S. PATENT DOCUMENTS

| | | | |
|---|---|---|---|
| 889,224 A | 6/1908 | Haas |
| 2,756,809 A | 7/1956 | Endresen |
| 3,112,137 A | 11/1963 | Drenth |
| 3,288,525 A | 11/1966 | Cerf |
| 3,713,696 A | 1/1973 | Dudley |
| 3,785,702 A | 1/1974 | Buehring |
| 4,572,578 A | 2/1986 | Perkins |
| 4,607,882 A | 8/1986 | Opsvik |
| 4,944,554 A | 7/1990 | Gross et al. |
| 4,960,304 A | 10/1990 | Frantz |
| 4,993,164 A | 2/1991 | Jacobsen |
| 5,328,245 A | 7/1994 | Marks et al. |

(Continued)

FOREIGN PATENT DOCUMENTS

JP    2006296960    11/2006

*Primary Examiner* — Rodney B White
(74) *Attorney, Agent, or Firm* — Workman Nydegger

(57) ABSTRACT

A backrest member (e.g., a portable insert) for use with a seat member of a chair. The backrest member may include an adjustable platform attached to a substrate (e.g., frame) of the backrest member, and an adjustment mechanism configured to adjust the adjustable platform along one or more locations of the platform to provide a desired contour for supporting the back of a user seated in the chair. The adjustable platform may comprise an elongate band attached to the substrate of the backrest member that is disposed along a central longitudinal axis of the backrest member. One end of the elongate band may be attached to the substrate, while an opposite end may be slidably attached to the substrate. In an embodiment, both ends may be slidably attached relative to the substrate. The device allows selection of a height and depth of a lumbar curve provided by the device.

15 Claims, 18 Drawing Sheets

(56) References Cited

U.S. PATENT DOCUMENTS

| | | |
|---|---|---|
| 5,344,211 A | 9/1994 | Adat et al. |
| 5,471,995 A | 12/1995 | Halliday |
| 5,553,917 A | 9/1996 | Adat et al. |
| 5,584,535 A | 12/1996 | Jacobsen et al. |
| 5,624,158 A | 4/1997 | Adat et al. |
| 5,636,900 A | 6/1997 | Wilkie et al. |
| 5,722,725 A | 3/1998 | McNaughton |
| 6,074,006 A | 6/2000 | Milosic et al. |
| 6,589,143 B2 | 7/2003 | Taylor |
| 6,609,754 B2 | 8/2003 | Rajasingham |
| 6,986,549 B2 | 1/2006 | Kniese |
| 7,125,077 B2 | 10/2006 | Frank |
| 7,237,848 B1 | 7/2007 | Story et al. |
| 7,347,495 B2 | 3/2008 | Beyer et al. |
| 7,484,802 B2 | 2/2009 | Beyer et al. |
| 7,703,849 B2 | 4/2010 | Bilak et al. |
| 7,909,402 B2 | 3/2011 | Chu et al. |
| 8,091,964 B2 | 1/2012 | Carter et al. |
| 8,261,386 B2 | 9/2012 | Kardos |
| 8,313,143 B2 | 11/2012 | Beyer et al. |
| 8,414,079 B1 | 4/2013 | Zenoff |
| 8,740,303 B2 | 6/2014 | Halliday et al. |
| 8,845,025 B2 * | 9/2014 | Kurata et al. ............ 297/284.4 |
| 2002/0130540 A1 | 9/2002 | Rajasingham |
| 2003/0047979 A1 | 3/2003 | Carom |
| 2004/0084941 A1 | 5/2004 | Asbach et al. |
| 2006/0238006 A1 | 10/2006 | Baranov et al. |
| 2008/0284222 A1 | 11/2008 | Draeger et al. |
| 2009/0236887 A1 | 9/2009 | Lu et al. |
| 2013/0127219 A1 | 5/2013 | Gerwig |

* cited by examiner

BACKREST MEMBER INCLUDING AN ADJUSTABLE PLATFORM FOR USE WITH A CHAIR

CROSS-REFERENCE TO RELATED APPLICATION

This application is a continuation-in-part of co-pending U.S. Pat. No. 8,740,303, filed Jun. 22, 2012, and issued Jun. 3, 2014, the disclosure of which is incorporated herein by reference in its entirety.

BACKGROUND OF THE INVENTION

1. The Field of the Invention

The present invention is in the field of seating.

2. The Relevant Technology

Office chairs and other seating devices are regularly employed by office workers the world over. There exists a continuing need for seating devices providing improved function.

BRIEF SUMMARY

In one aspect, the present invention is directed to a chair including a seat member for supporting a user, a backrest member mounted on the seat member, an adjustable platform attached to the backrest member in which the adjustable platform is selectively adjustable to provide a desired contour for supporting the back of a user seated within the chair, and a multipoint adjustment mechanism configured to adjust the adjustable platform along multiple locations of the platform to provide a desired contour for supporting the back of a user seated within the chair.

Another embodiment is directed to a chair comprising a seat member for supporting a user, a backrest member attached to a back portion of the seat member in which the backrest member includes a plurality of longitudinally aligned holes formed therethrough. The holes are disposed along a center portion of the backrest member. The chair further includes an adjustable platform attached to the backrest member that is aligned with the plurality of longitudinally aligned holes. Also provided is a plurality of contour adjusting screws corresponding to the plurality of holes in which corresponding screws extend through respective holes so that the screws are configured to selectively adjust the contour provided by the adjustable platform.

Another embodiment is directed to a chair comprising a seat member for supporting a user, a backrest member attached to a back portion of the seat member in which the backrest member includes a plurality of longitudinally aligned holes formed therethrough. The holes are disposed along a center portion of the backrest member. The chair further includes an elongate band attached to the backrest member, in which the elongate band is aligned with the plurality of longitudinally aligned holes. One end of the elongate band is fixedly attached to the backrest member and an opposing end of the elongate band is movably coupled to the backrest member. The chair further includes a plurality of curve adjusting screws corresponding to the plurality of holes. The screws extend through respective holes so that the screws contact the elongate band and can be selectively adjusted to provide a selected curvature to the elongate band.

Another aspect of the present invention is directed to a method for custom fitting a chair to a person. Such a method includes measuring a curvature of a person's back relative to an idealized curvature for that person, providing a customized chair such as any of those described above that is configured to improve a person's back posture, and adjusting the multipoint adjustment mechanism (e.g., a plurality of contour adjusting screws) to provide the idealized curvature to the adjustable platform (e.g., an elongate band) of the chair so that the chair supports the person in an idealized posture. Such a method can apply a force vector to the person's back as the user sits in the chair to aid the user in improving their posture over time.

Another aspect of the present invention is directed to a backrest member (e.g., such as that that forms a portion of a chair as described above, or which may be a separate and portable backrest member insert that can be inserted between the back of a user and a backrest member of an existing chair to provide the desired contour for supporting the back of a user seated within the chair. In an embodiment, such a chair may be a vehicle seat (e.g., a seat of an automobile). Such a backrest member for use with a seat member of a chair may include an adjustable platform attached to a substrate (e.g., frame) of the backrest member. The adjustable platform may be selectively adjustable to provide a desired contour for supporting the back of a user seated within the chair. The backrest member may further include an adjustment mechanism configured to adjust the adjustable platform along one or more locations of the platform to provide a desired contour for supporting the back of a user seated within the chair. The adjustable platform may comprise an elongate band attached to the substrate of the backrest member, disposed along a central longitudinal axis of the backrest member. One end of the elongate band may be attached to the substrate of the backrest member, and an opposite end of the elongate band may be slidably attached relative to the substrate of the backrest member.

A portable backrest member insert may be provided separate from a chair, but for use with a chair, so as to provide an adjustable platform configured to provide an improved, desired contour for supporting the back of a user seated within the chair. The portable backrest member insert may comprise an adjustable platform attached to a substrate (e.g., frame) of the backrest member, the adjustable platform being selectively adjustable to provide a desired contour for supporting the back of a user seated within the chair. An adjustment mechanism configured to adjust the adjustable platform along one or more locations of the platform may be provided to provide a desired contour for supporting the back of a user seated within the chair. The adjustable platform may comprise an elongate band attached to the substrate of the backrest member and disposed along a central longitudinal axis of the backrest member. One end of the elongate band may be slidably attached relative to the backrest member and an opposite end of the elongate band may also be slidably attached relative to the backrest member such that the elongate band presents a curved surface providing the desired contour for supporting the back of a user seated against the portable backrest member insert as the two ends of the elongate band are slid towards or apart from one another to desired positions of the two ends (i.e., so as to create the desired curve in the elongate band).

A related method for providing a vehicle seat with a backrest member that includes an adjustable platform that is selectively adjustable to provide a desired contour for supporting the back of a user seated within the seat is also disclosed. Such a method may include providing an adjustable backrest member (e.g., separate from a seat member and/or other chair components, as described herein). For example, the adjustable backrest member may be a portable insert that during use is inserted between a back of a user and an integrated backrest member of a vehicle seat. Positioning the adjustable backrest member adjacent a rear end of the seat member of the vehicle seat, against the integrated backrest member of the vehicle seat to be "improved", provides the vehicle seat with the desired contour for supporting the back of a user seated within the vehicle seat.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

The present invention is directed to chairs and related methods for improving the posture of a user of the chair. The chair is custom built based on anatomical measurements taken of the specific user of the chair, including measurement of the contour of the user's back. In addition to a seat member and a backrest member, the backrest member of the chair includes an adjustable platform (e.g., an elongate band) that is selectively adjustable so as to provide a desired contour for supporting the back of the user seated in the chair. The adjustable platform is selectively adjustable through manipulation of a multipoint adjustment mechanism (e.g., a plurality of contour adjusting screws) included in the chair that allows adjustment of the contour provided by the platform along multiple locations so that the specific contour provided by the elongate band or other adjustable platform can be custom dialed in so as to provide a contour specifically configured to support the particular user's back. The contour provided by the elongate band or other adjustable platform may represent an improvement over the measurement taken of the contour of the user's back on which construction of the chair was based. For example, the contour provided by the adjustable platform may apply a force vector to the user's back during use of the chair so as to improve the posture of the user over time. The adjustable platform and multipoint adjustment mechanism allow changes to the provided custom contour after initial setting (e.g., incremental changes may be made as the posture of the user improves).

Another aspect of the present invention is directed to the backrest member of such a chair, or a backrest member for use with a chair (e.g., a chair including a seat member). Such a backrest member may be provided as an insert that is not itself a chair, but is provided as an insert to modify and improve back support provided by a given chair (e.g., an existing office chair, vehicle seat, etc.).

II. Exemplary Chairs

Figure 1:
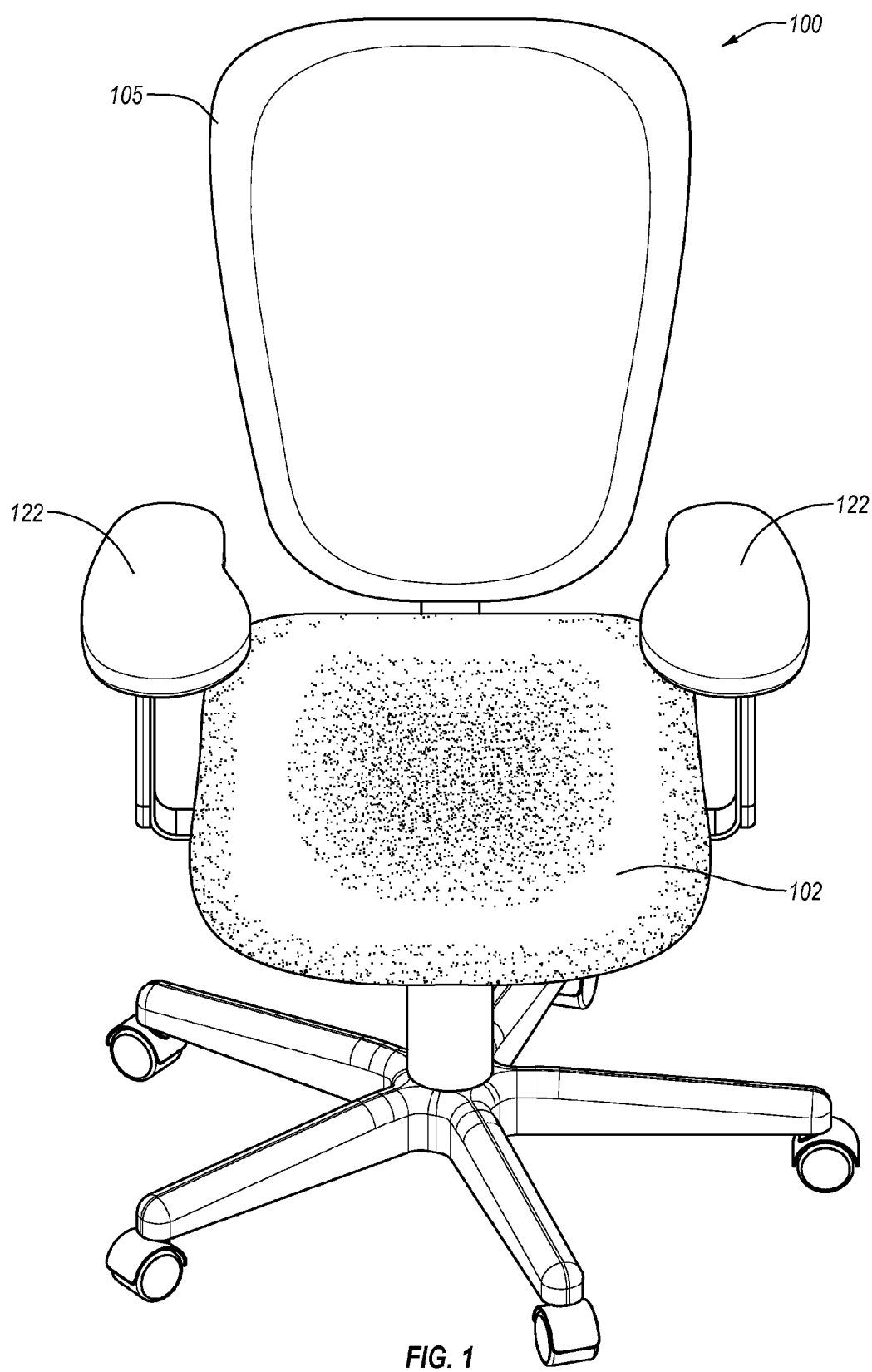
FIG. 1 is a perspective view of a finished chair according to an embodiment of the present invention.

FIG. 1 shows chair 100 including seat member 102 for supporting a user and a finished backrest member 105 mounted on seat member 102. Finished backrest member 105 is shown oriented at about 90° and vertical relative to horizontal seat member 102. In at least some embodiments, finished backrest member 105 does not recline relative to seat member 102, so as to better provide the desired support and posture corrective force vector to the user's back.

Figure 2:
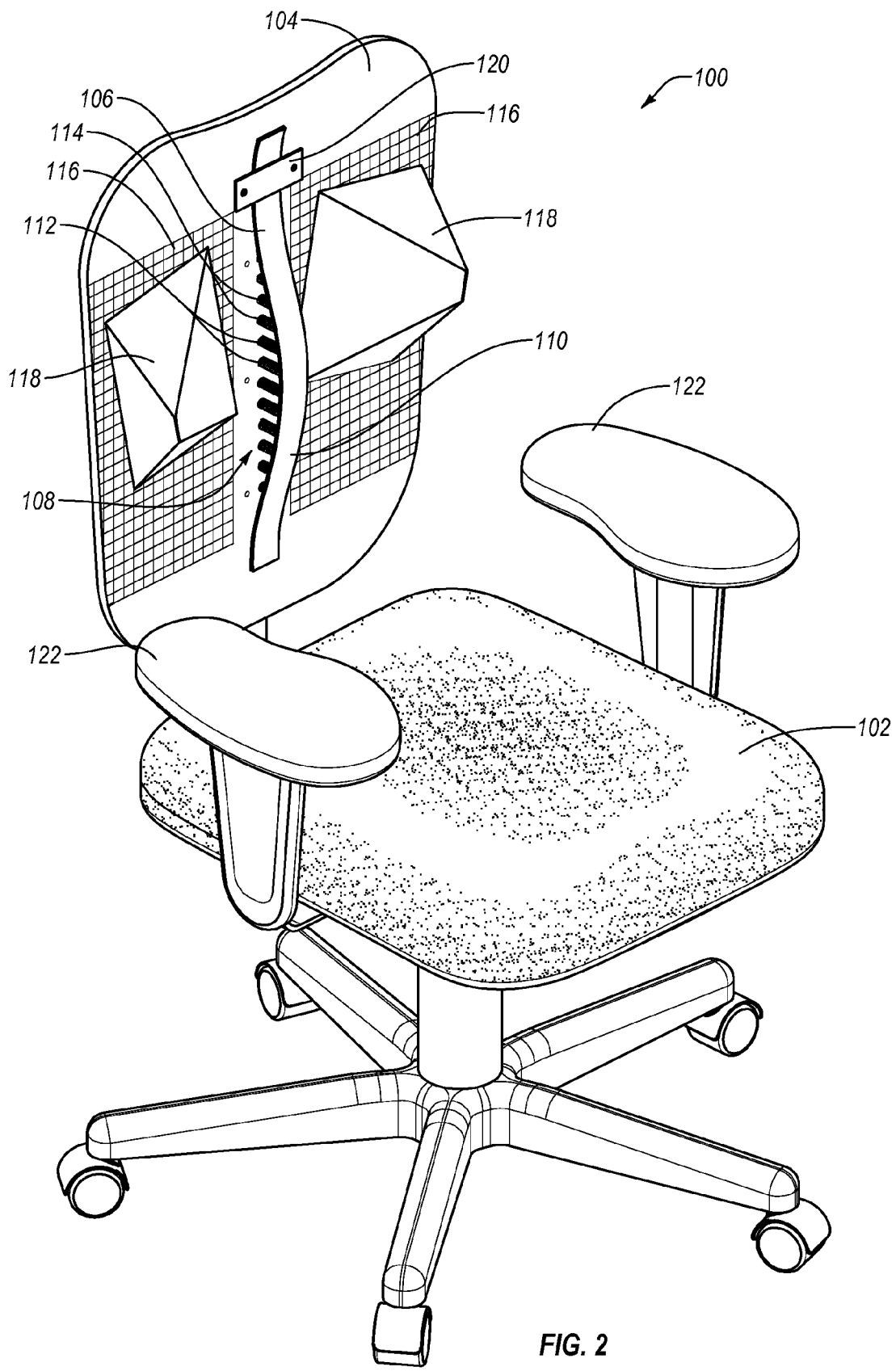
FIG. 2 is a perspective view of the chair of FIG. 1 in which the upholstery and padding materials have been removed from the backrest member so that the internal components are visible.
Figure 3:
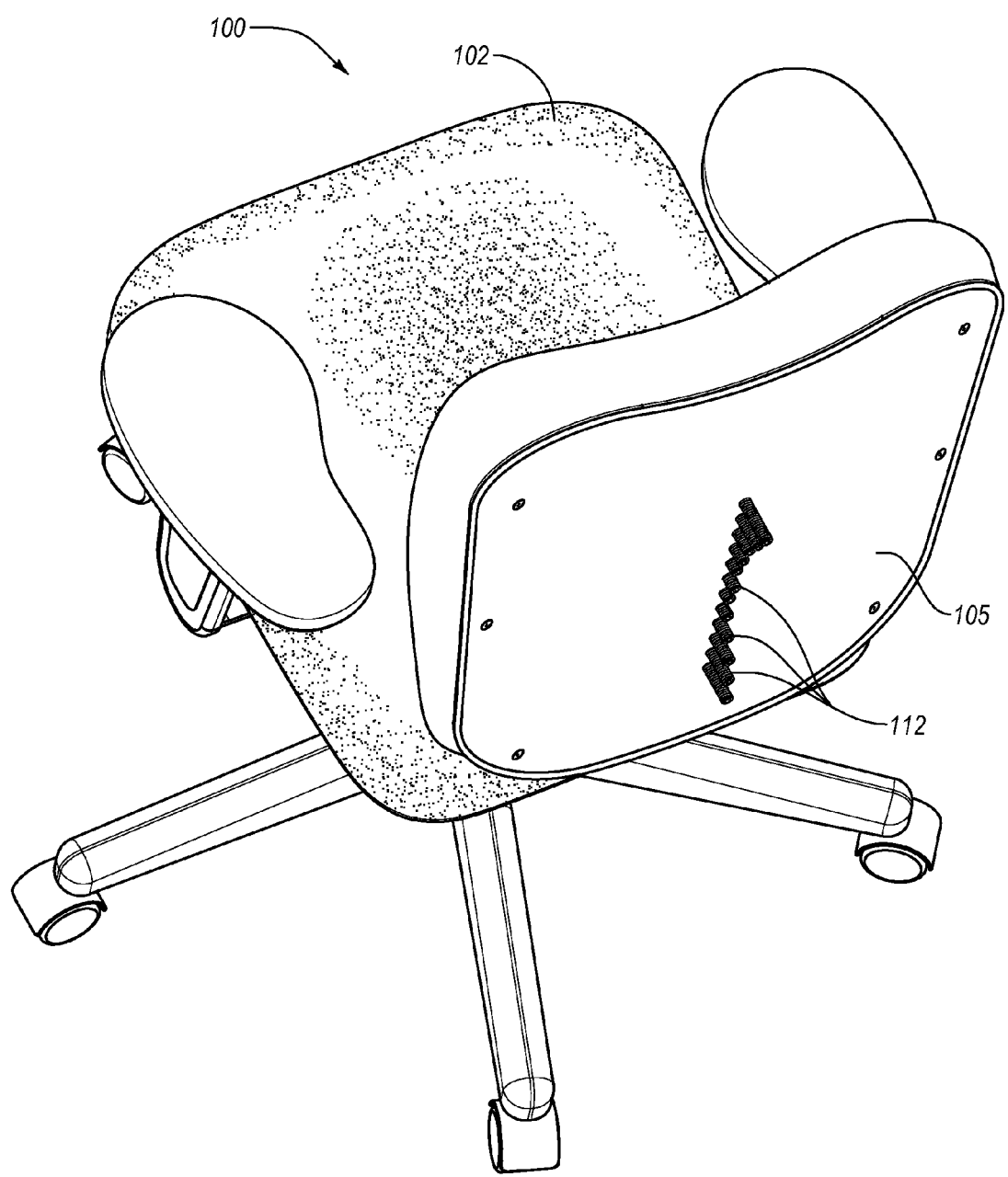
FIG. 3 is a perspective view of the back of the chair of FIG. 1, showing how the contour adjusting screws are accessible at the back surface of the backrest member of the chair.

FIG. 2 shows the front portion of chair 100 in which the upholstery and padding material have been removed from finished backrest member 105, showing components included internally within upholstered backrest member 105. As seen in FIG. 2, the board or other substrate 104 (also referred to herein as a backrest member 104) that is eventually covered and enclosed with upholstery and padding material may be substantially planar, while the finished upholstered backrest member 105 as shown in FIGS. 1 and 3 may exhibit some curvature.

As seen in FIG. 2, backrest member 104 is provided with an adjustable platform 106 that is selectively adjustable to provide a desired contour for supporting the back of a user seated within chair 100. Provided in combination with adjustable platform 106 is multipoint adjustment mechanism 108. Multipoint adjustment mechanism 108 is configured to adjust adjustable platform 106 along multiple locations of the platform in order to provide a desired contour as seen in FIG. 2 to support the back of a user seated within chair 100.

The particular configuration of adjustable platform 106 and multi-point adjustment mechanism 108 illustrated in FIG. 2 includes elongate band 110, and a plurality of contour adjusting screws 112. The configuration shown in FIG. 2 includes a plurality of longitudinally aligned holes 114 formed through backrest member 104. Holes 114 are disposed along a center portion of backrest member 104 and are configured to receive corresponding screws 112. Thus, each screw may be selectively advanced into backrest member 104 so as to contact a back side of elongate band 110. Elongate adjustable platform 106 (e.g., band 110) is longitudinally aligned with holes 114. Because band 110 is flexible so as to be capable of forming a curve in the back-front direction of chair 100, the further any given screw 112 is advanced the further forward it pushes the contacted portion of band 110. This allows one to provide band 110 with a selected curved contour by adjusting how far forward the various screws 112 are advanced.

As seen in FIG. 2, one end (e.g., a bottom end) of elongate band 110 is fixedly attached to backrest member 104, while an oppositely disposed end of elongate band 110 is movably attached relative to backrest member 104 so as to allow the curvature of band 110 to be adjusted. In other words, as the arc length of the total curved contour provided by band 110 becomes longer the slidably disposed end of band 110 is free to slide in and out within sleeve 120. In the illustrated embodiment, a top end of elongate band 110 is slidably received within sleeve 120 so as to allow the top end of elongate band 110 to slide in and out of sleeve 120 as screws 112 are advanced or retreated in order to alter the curvature provided by elongate band 110.

While the top end of band 110 is shown as being slidable relative to backrest member 104 within sleeve 120 it is to be understood that the configuration may alternatively be reversed, so that the top end of band 110 is fixedly attached (e.g., with one or more screws) to backrest member 104 while the opposite bottom end of band 110 may be slidably or otherwise movably coupled relative to backrest member 104.

Elongate band 110 may be semi-rigid in the sense that it is flexible in a "front-back" direction so as to assume a curvature as screws 112 push a back surface of elongate band 110 forward. Absent application of any such force, band 110 may default to a position adjacent to backrest member 104, with no curvature. The band is formed of an otherwise relatively rigid material so that it maintains the curvature defined by screws 112, so long as screws 112 continue to contact the back surface of elongate band 110. By way of example, band 110 may be formed of a semi-rigid but flexible plastic material (e.g., acrylonitrile butadiene styrene (ABS), a polyolefin such as polypropylene, polyethylene, etc.) or metal. The material should be sufficiently flexible rather than brittle so as to accept a bend rather than crack or fracture upon advancement of screws 112. The thickness and geometry of band 110 may aid in achieving these characteristics. For example, the illustrated embodiment shows band 110 having a thickness of about 0.0625 inch to about 0.25 inch and a width of about 0.5 inch to about 1.5 inches. The particular thickness and width may depend on the material from which band 110 is formed.

Band 110 may have a length from about 16 inches to about 24 inches, or from about 20 inches to about 24 inches. Because of the relative thinness of band 110, it is capable of flexing and bending in the "forward-back" direction, so as to assume a curvature as shown in FIG. 2 upon advancement of screws 112.

As seen in FIG. 2, the front surface of backrest member 104 may include a grid pattern 116 thereon that may aid in precision placement and adjustment of the various structural components mounted on backrest member 104. For example, as shown, backrest member 104 may include a pair of oppositely disposed rib cage supporting wing members 118. Grid pattern 116 may be printed (e.g., silkscreened) or otherwise applied to backrest member 104. As seen in FIG. 2, wings 118 are placed over grid pattern 116 on either side of elongate band 110. The particular positioning (e.g., "up-down" and "in-out") of wings 118 relative to elongate band 110 may be determined based on anatomical measurements of the user for which the chair 100 is custom manufactured. Grid pattern may be labeled with numbers in one direction and letters in the other direction, so that a manufacturer or practitioner may record positioning of various components (e.g., upper corner of left wing in quadrant B-4). In one embodiment, the grid may include grid lines spaced about 0.5 inch apart.

Wings 118 can include a ramped configuration as shown, so as to include a greater thickness adjacent the outside edges of backrest member 104 and a lesser thickness adjacent elongate band 110, oriented towards the center of backrest member 104. The wings may be oriented so as to be spaced apart, but angled relative to one another, so that wings 118 are closer together adjacent their lower ends, and further from one another adjacent their top ends. This configuration advantageously serves to cradle the rib cage of the user seated within the chair. As described, the exact positioning of wings 118 may be custom determined based on anatomical measurements taken of the user for which the chair is manufactured.

In addition, the exact position of wings 118 may be adjusted following a first fit of the user with the chair. For example, if the wings 118 are crowding the user's rib cage, they may be moved out more to the sides during an adjustment. The presence of grid pattern 116 greatly aids the predictability of any such adjustments (i.e., making it easier for the manufacturer or practitioner to know what was adjusted and by how much).

As shown in FIG. 2, chair 100 may further include a pair of oppositely disposed armrests 122 on either side of seat member 102. Similar to the positioning of rib supporting wing members 118, the height of armrests 122 may be determined based on anatomical measurements of the user for which the chair is manufactured. For example, while many mass produced chairs include armrests in which the height of the armrests is somewhat adjustable, it is often the case that the range of height adjustment is insufficient to position the armrests 122 at an ideal height, so that the elbows are bent at about 90°. In addition, even where the height of the armrests may be adjustable, their distance "in-out" relative to seat member 102 is not. According to one embodiment of the present invention, the position of the armrests, including "in-out" distance relative to seat member 102, as well as their height above seat member 102 is custom configured based on anatomical measurements of the particular user for which the chair is manufactured.

Figure 2A:
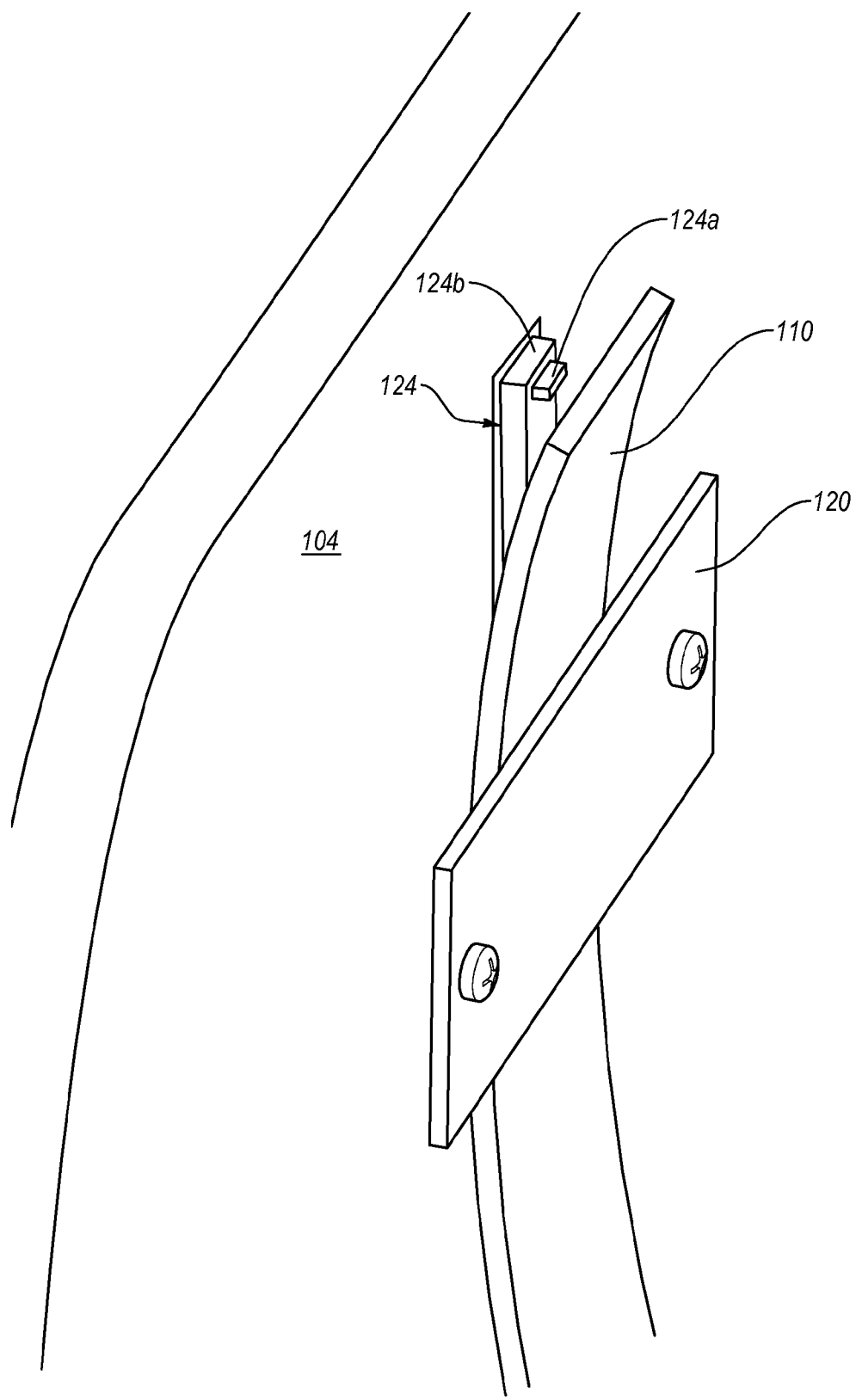
FIG. 2A is a close up view showing a feedback device attached to an upper portion of the backrest member of the chair of FIG. 2, which feedback device provides audible, tactile, or other feedback to a user of the chair as the user performs an axial extension exercise.

As perhaps best seen in FIG. 2A, one embodiment may include an auditory or tactile feedback device 124 attached to an upper portion of backrest member 104, along the longitudinal center axis of backrest member 104. Feedback device 124 is aligned with elongate band 110 so that when a force is applied to a front surface of the top portion of elongate band 110, feedback device 124 provides an audible, tactile or both type signals to a user. FIG. 2A includes a close up view showing feedback device 124 attached to or embedded within backrest member 104. In the illustrated configuration, the upper portion of band 110 aligned with feedback device 124 may also be above and aligned with holes 114 and screws 112, which are also disposed along the longitudinal center axis of backrest member 104.

Such a feedback device 124 can provide feedback to a user seated within the chair who engages in an axial extension exercise, where the user lifts and extends the upper portion of their torso, straightening the torso relative to the torso's longitudinal axis. Such a movement causes the upper central portion of the user's back to press against the front surface of the upper portion of the upholstered backrest member 105 of the chair, pressing the top portion of band 110 so as to contact feedback device 124. In one embodiment, feedback device 124 may comprise a simple clicker device (e.g., similar in concept to a doorbell) where the device emits an audible or tactile "click" when the button 124a is pressed into body 124b.

Upon relaxing following the axial extension exercise, the button 124a returns to its default location, and the user may again engage in the exercise, in order to again achieve the audible or tactile "click" feedback. A user may be encouraged to achieve a certain number of clicks within a given period of time (e.g., a certain number per day). Repetition of the axial extension exercise can contribute to improvement of the user's posture, particularly when coupled with the force vector that is applied to the user's back through band 110 and screws 112.

Figure 2B:
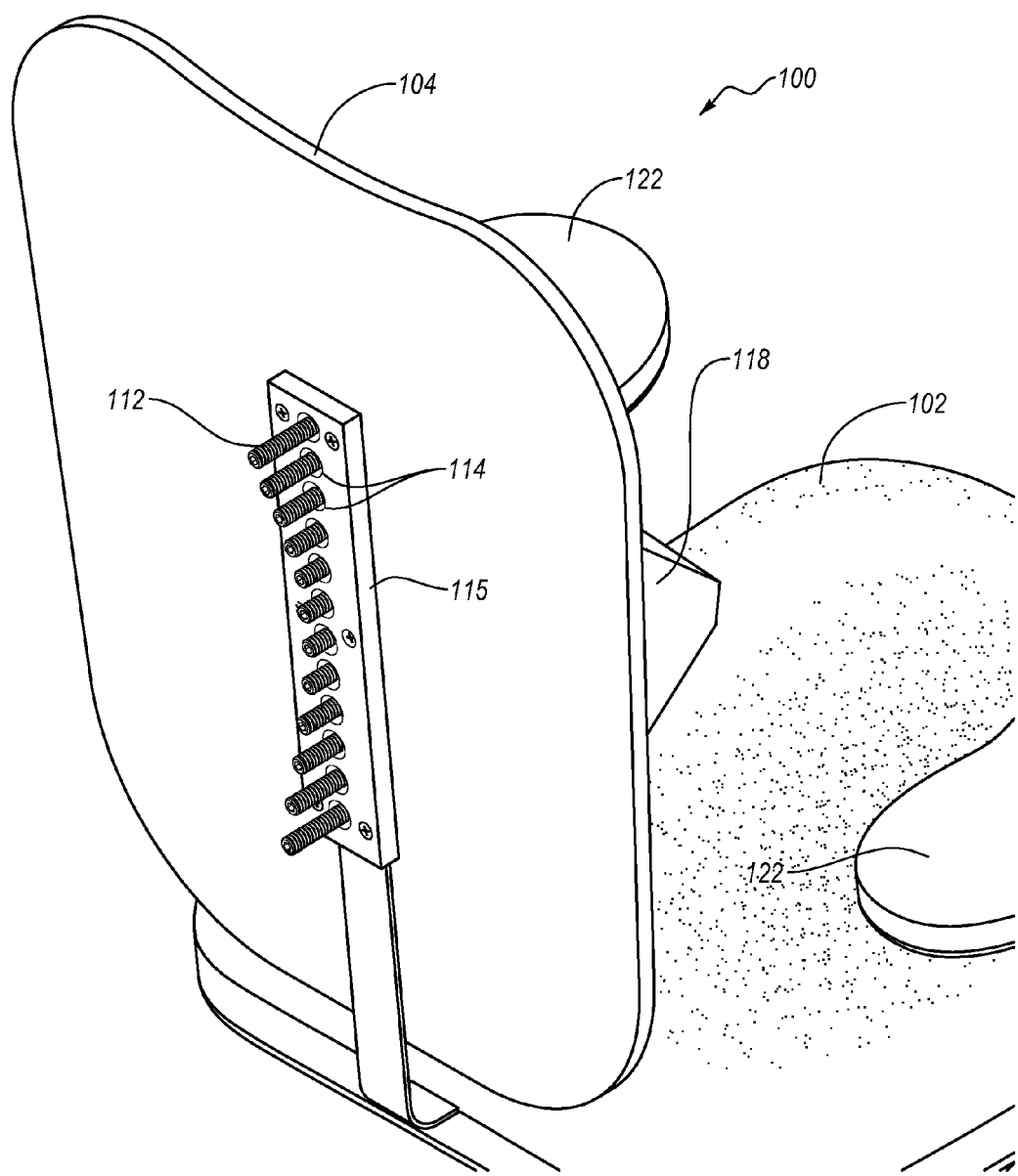
FIG. 2B is a perspective view showing the back surface of the backrest member of the chair of FIG. 2.

FIG. 2B shows another perspective view of the chair 100 of FIG. 2, showing the back surface of backrest member 104 without the upholstery and padding material in place. As seen, an index block 115 may be attached to back surface of backrest member 104. Longitudinally aligned holes 114 extend through block 115 and backrest member 104. A series of 12 aligned holes 114 and screws 112 are shown. Such a number of screws provides great flexibility in attaining any desired curvature in elongate band 110. More broadly speaking, a series of about 10 to about 15 aligned holes and screws may be employed. Where not every screw or hole is needed (e.g., where a person is shorter so as to have a shorter lumbar curve), plugs may be placed within holes that are not employed.

Figure 2C:
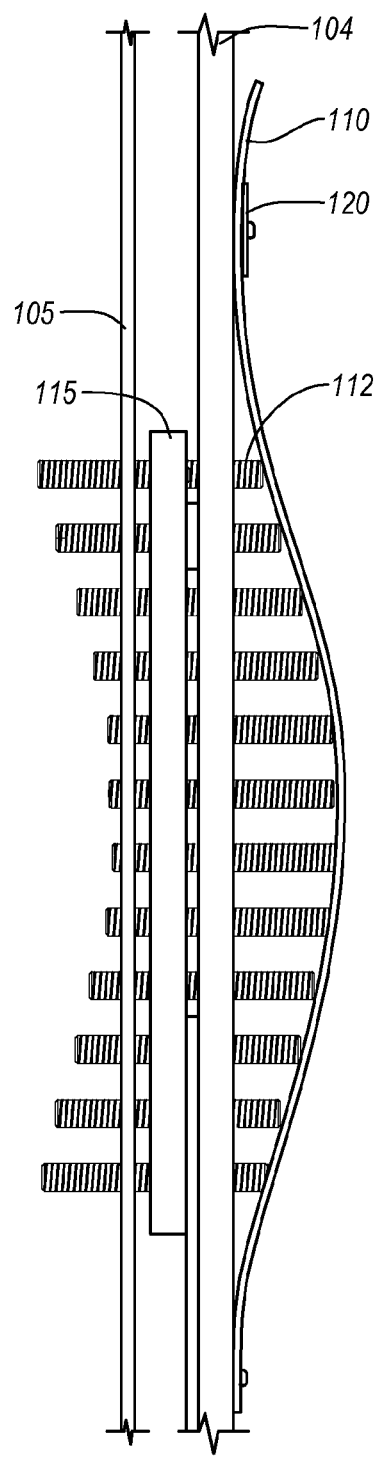
FIG. 2C is a close up view of the adjustable platform and contour adjusting screws mounted on the backrest member of the chair of FIG. 2.
Figure 2D:
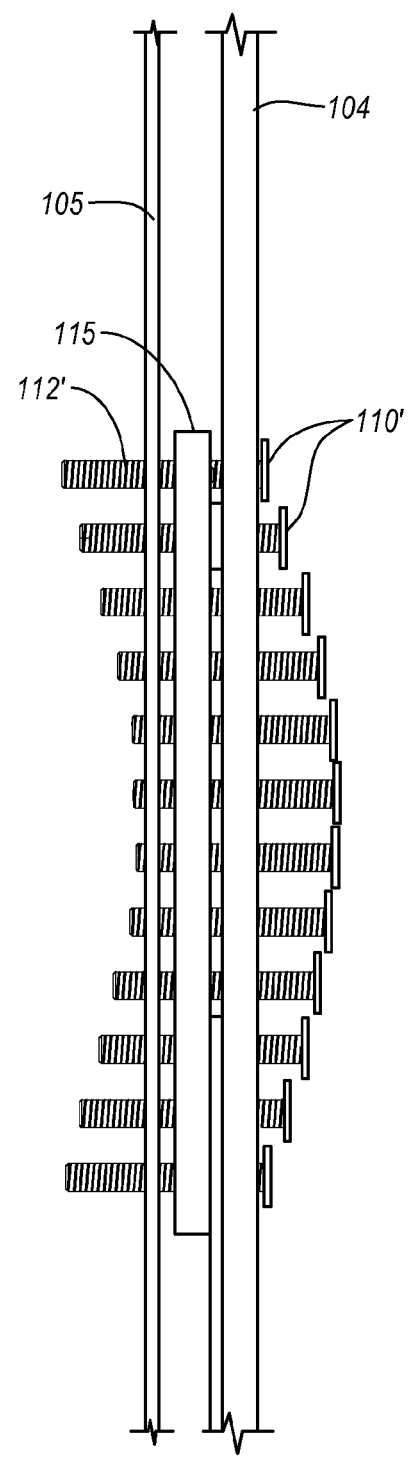
FIG. 2D is a close up view of an alternative adjustable platform configuration comprising a plurality of enlarged heads attached to a plurality of contour adjusting screws, in which the series of enlarged heads provide a desired contour.

FIG. 2C shows a close up side view of adjustable platform 106, including elongate band 110 and contour adjusting screws 112. The contour surface provided by adjustable platform 106 may be provided by one continuous member (e.g., elongate band 110), or alternatively may be provided by multiple members that are discontinuous from one another. For example, FIG. 2D shows an alternative adjustable platform structure that includes a plurality of contour adjusting screws 112', each with an enlarged head 110'. As the screws 112' are advanced or retracted relative to backrest member 104, they provide a contour for supporting the back of a user seated within the chair. While enlarged heads 110' may not provide a smooth curve provided by band 110 due to the stepped configuration, a similar result may be achieved once the heads 110' providing the platform have been covered by padding material and upholstery in the finished chair. The finish upholstery and padding material in effect may provide a substantially smooth curvature to the contour experienced by a user seated within such a chair. Of course, the configuration including an elongate band 110 as shown in FIG. 2C may be preferred as it provides a smooth curvature, and such a flexible band can also be used to activate a feedback device 124 as described in conjunction with FIG. 2A. Various other adjustable platform structures and multi-point adjustment mechanisms that may be apparent to one of skill in the art in light of the present disclosure are also within the scope of the present invention.

FIG. 3 shows a view of the back of chair 100 seen in FIG. 1. As is readily apparent, screws 112 are accessible at the back surface of chair 100, while backrest substrate 104, elongate band 110, wings 118, grid pattern 116, and the opposite end of screws 112 that contact band 110 and provide the desired curvature are enclosed within padding and upholstery material placed over these structures. Because screws 112 are accessible at the back surface of finished backrest member 105, the curvature provided by screws 112 and elongate band 110 can advantageously be easily adjusted as needed to provide a curvature that provides custom support to the user's back, and can also advantageously apply a force vector to improve the user's posture over time as the chair is used by the user.

Screws 112 may have any desired length. For example, the length may be sufficient to be accessible at back surface of backrest member 104, while providing a desired curvature to elongate band 110. By way of example, a typical maximum length between the front surface of backrest member 104 and contacted surface of elongate band 110 may be about 1 to about 4 inches (e.g., about 2 inches). Screws 112 may have a length of about 4 inches. In other words, this may be the maximum depth of the curve or contour provided by adjustable platform 106 (e.g., elongate band 110). Such a portion of the curved contour provided by elongate band 110 and screws 112 may correspond to the lumbar curve of the particular user for which the chair is custom fitted. Because of the multi-point adjustment mechanism provided by screws 112 and flexible elongate band 110, variations in the height location, length, and depth of any given person's lumbar curve can be accommodated.

For example, there exists a relatively wide variation to the lumbar curve apex as to its height above seat member 102, as well as the depth of the lumbar curve apex as to its spacing relative to front surface of backrest member 104. Typical height values for the apex for lumbar curves for any given person may range from about 8 inches to about 15 inches above seat member 102. As will be readily apparent, the ability to position the apex of the lumbar curve, and to provide the curve with the appropriate depth at a desired height above seat member 102 is greatly advantageous. In addition, the length of the lumbar curve for various persons can be accommodated because of the multipoint adjustment mechanism provided by elongate band 110 and screws 112.

III. Exemplary Methods of Use

According to one embodiment of the present invention, the chair 100 is custom fitted to a person through anatomical measurements taken of the user. The curvature set within elongate band 110 may be set based upon a measured curvature of the user's back. The curvature of elongate band 110 may not be exactly the same as that exhibited by measurement of the user's back, particularly where the user desires to improve their posture through use of the chair, not simply to support the user's current back contour. Typically, the user's lumbar curve exhibits decreased arc depth (i.e., curvature) and decreased arc length as a result of poor habits (e.g., working within an office environment in which idealized posture is not maintained). As such, the curvature provided by elongate band 110 may differ from a measured curvature of the user's back so as to apply a force vector configured to lengthen the lumbar curve and/or to alter the arc depth or curvature so as to improve the user's posture as the chair is used.

Figure 4:
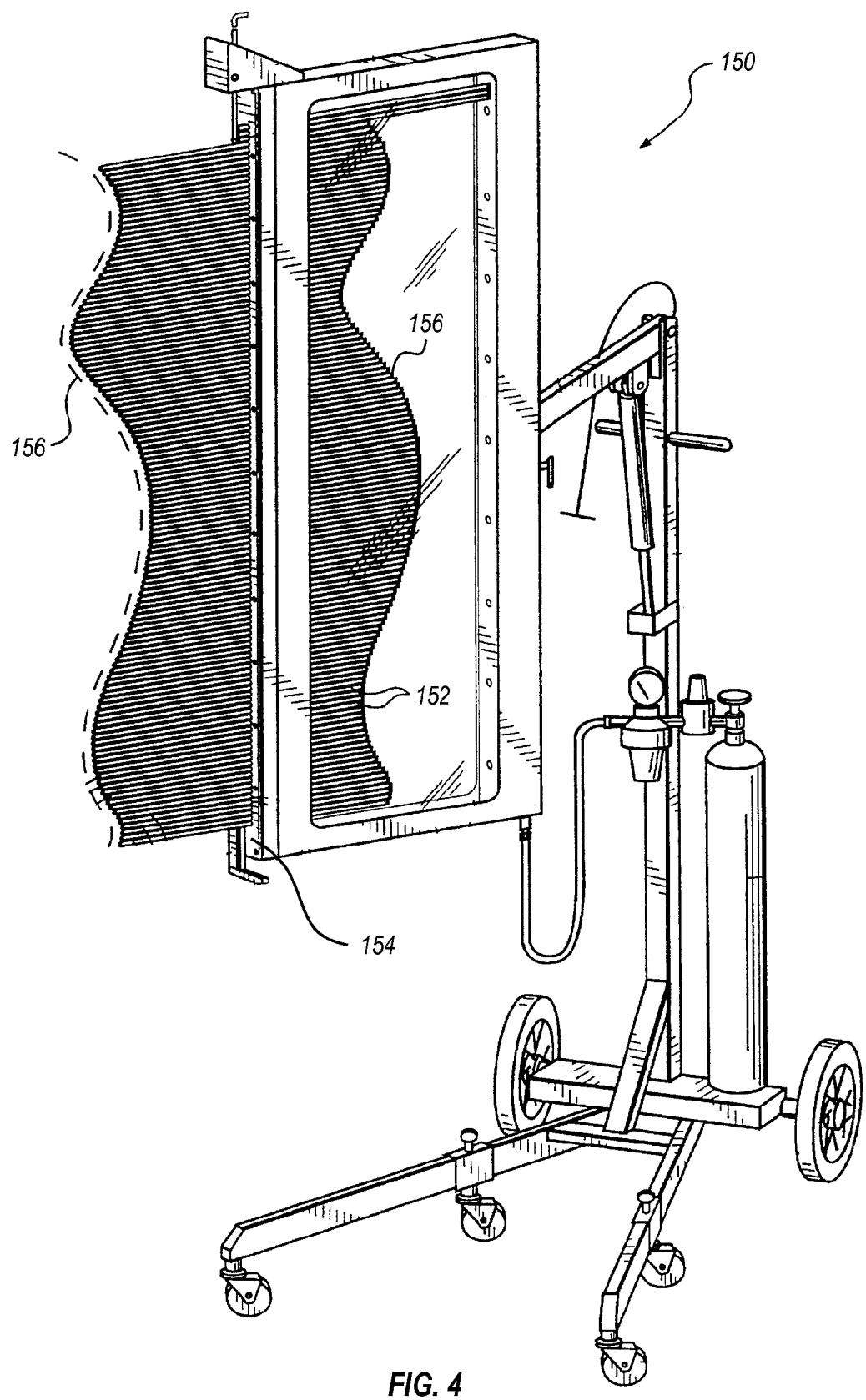
FIG. 4 is a perspective view of an exemplary device for measuring the contour of a person's back.

FIG. 4 shows an exemplary spine contour gauge 150 that may be used to measure the curvature of a prospective user's back. Gauge 150 generally includes a plurality of coplanar shafts 152 that are slidable within a guide block 154. Shafts 152 are advanced while the user stands or sits adjacent the shafts, which are gently advanced (e.g., through application of a pressurized gas) against the spinal region of the user's back. Once this is done, the user may step away from the gauge 150, while the contour 156 of the person's spinal contour is recorded by the position of the series of shafts. This contour may be scanned into a computer for measurement and analysis of the various regions of the contour. Such a spine contour gauge and method is described in U.S. Pat. No. 5,471,995, herein incorporated by reference in its entirety.

Figure 5:
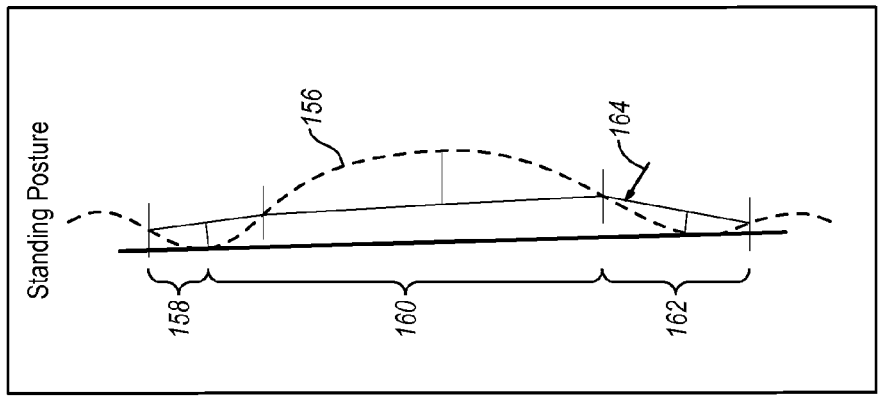
FIG. 5 is a contour plot specific to a particular user as generated by the device of FIG. 4.

FIG. 5 shows a contour 156 of an exemplary user's spinal region of the back, as well as an analysis of the contour. As seen in FIG. 5, a target or idealized curvature may recommend that cervical portion 158 of contour 156 be about 20% of the total arc length of contour 156, that thoracic portion 160 of contour 156 be about 50% of the total arc length of contour 156, and that lumbar portion 162 of contour 156 be the remaining about 30% of the total arc length of contour 156.

As seen in FIG. 5, the lumbar portion 162, corresponding to the lumbar curve of the particular user measures only 23.8% of the total arc length 156, which is significantly less than the target value of 30%. This represents a collapse of the lumbar curve, which may be likely to progressively continue over time, absent intervention. In order to lengthen the arc length of the lumbar curve 162, screws 112 and elongate band 110 may be set to provide a curve with a somewhat greater length than the existing lumbar curve 162. For example, a curve may be provided that would apply a force vector 164 to an upper portion of lumbar curve 162 to lengthen the curve over time, causing the user's posture to change over a period of weeks or months to be closer to the target or ideal values shown in FIG. 5 (e.g., where lumbar curve 162 accounts for about 30% of the total arc length of contour 156).

Clinical testing by the inventors has shown that such correction can be achieved relatively quickly, for example, over a period of typically about 4-6 weeks where the chair is used to apply the desired force vector 164. While some cases may take longer (e.g., a period of several months), testing has shown that significant improvement sufficient to reach the desired target values can be achieved within less than a year, even in the slowest cases. Use of the chair 100 not only improves the posture over time, when the settings of the various components of the chair can be set and adjusted by a qualified technician or practitioner. For example, continued use of the chair within a correct environment (e.g., correct relative placement and use of a desktop surface, keyboard, monitor(s), footrest, etc.) helps the user to maintain the improved posture once it has been achieved, as absent continued best practices, the user's back posture is likely to deteriorate.

In order to achieve the desired results, it will be readily apparent that in some embodiments, the prospective user is measured (e.g., measurement of the curvature of the user's spinal region of the back, as well as various other anatomical measurements to determine placement of wings 118, the specific location of armrests 122, etc.) so that the chair can be custom manufactured to the specifications required by the user's anatomy. Once such a chair is provided, the multipoint adjustment mechanism can be adjusted as required. For example, screws 112 and elongate band 110 together provide a desired contour configured to support the user's back, while applying a force vector to "push" the user's contour 156 towards an idealized curvature as the user sits in the chair over a period of weeks or months on a daily or otherwise recurring basis.

Exemplary measurements may include measurement of the contour of the spinal region of the user's back while standing, while seated, measurement of the vertical distance from seat member 102 to the lumbar curve apex, measurement of the lumbar arc length, lumbar arc depth, and lumbar curvature (e.g., the reciprocal of the radius of curvature). Additional measurements may include measurement of the torso width at axilla, measurement of the torso width at olecranon, measurement of the inter-scapular distance, measurement of the inter-olecranon distance, measurement of the inferior angle above seat member distance, measurement of the maximum width of the hips, measurement of the olecranon above seat member distance, measurement of the sacrum to popliteus distance, measurement of the internal shoulder rotation, measurement of the user's desk height, and measurement of focal distance.

Exemplary values for these measurements as measured for the prospective user noted in FIG. 5 are shown in Table 1 below. As will be apparent from the above description, some of the dimensions from which the chair is manufactured (as shown in Table 1) may vary somewhat from the measured values. For example, while the average lumbar arc curvature measured in FIG. 5 is 495, the value shown in Table 1 is 358, as the values shown in Table 1 may account for the desire to build in a force vector configured to improve the user's posture as the chair is used.

TABLE 1

| Sagittal Assessment | |
|---|---|
| Spine shape of standing subject | See FIG. 5 |
| Vertical distance from seat member to lumbar apex | 10.5 inches |
| Lumbar arc length | 7.5 inches |
| Lumbar arc depth | 1 inch |
| Lumbar arc curvature | 358 |
| Anthropometric Assessment Frontal Plane | |
| Torso width at axilla | 13 inches |
| Torso width at olecranon | 10.25 inches |
| Inter-scapular distance | 6 inches |
| Inter-olecranon distance | 17.5 inches |
| Interior angle above seat member distance | 19 inches |
| Maximum width of hips | 15.25 inches |
| Sagittal Plane | |
| Olecranon above seat member distance | 11 inches |
| Sacrum to popliteus distance | 18 inches |
| Popliteus to heel distance | 19 inches |
| Transverse Plane | |
| Internal shoulder rotation | 25° |
| Desk height | 29.5 inches |
| Focal distance | 23 inches |

Figure 6:
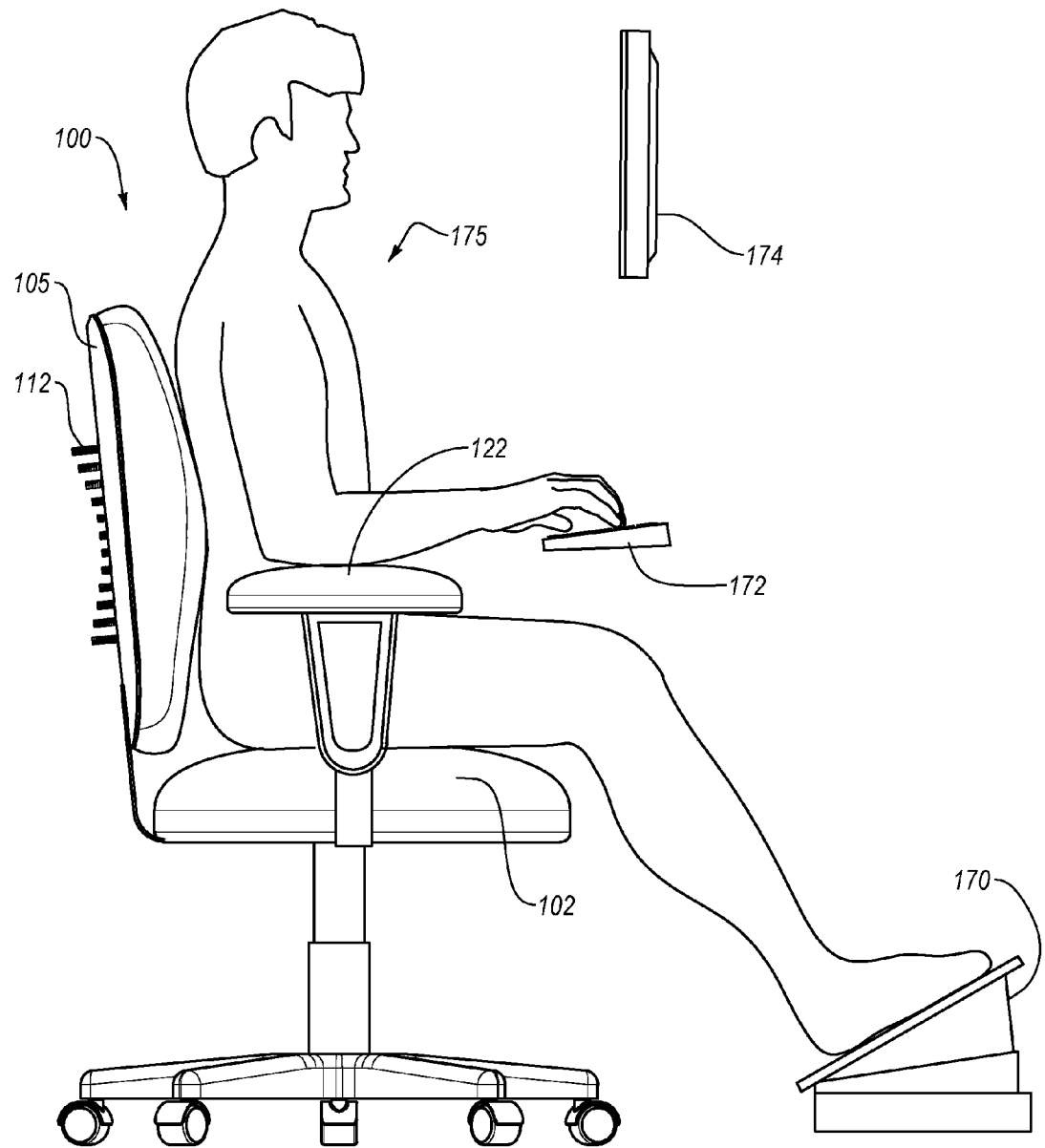
FIG. 6 is a side view showing a user seated within the chair of FIG. 1 with the adjustment platform applying a force vector to improve the contour of the user's back.
Figure 7:
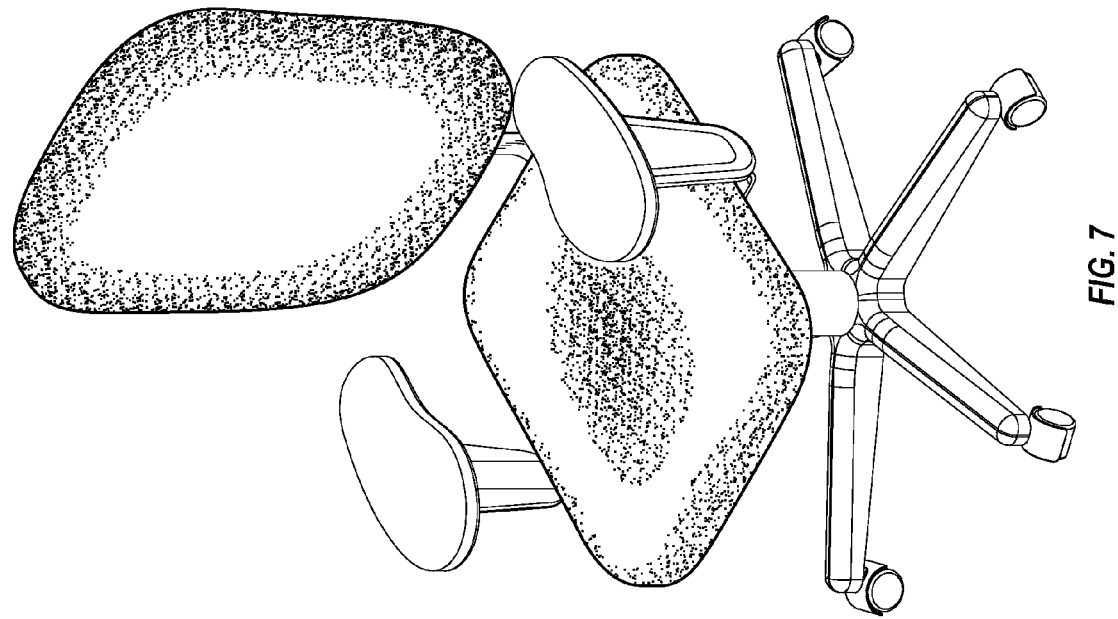
FIGS. 7-13 show a perspective view, a front view, a back view, a side view, an opposing side view, a top view, and a bottom view, respectively, of an ornamental design of a chair according to the present invention.
Figure 9:
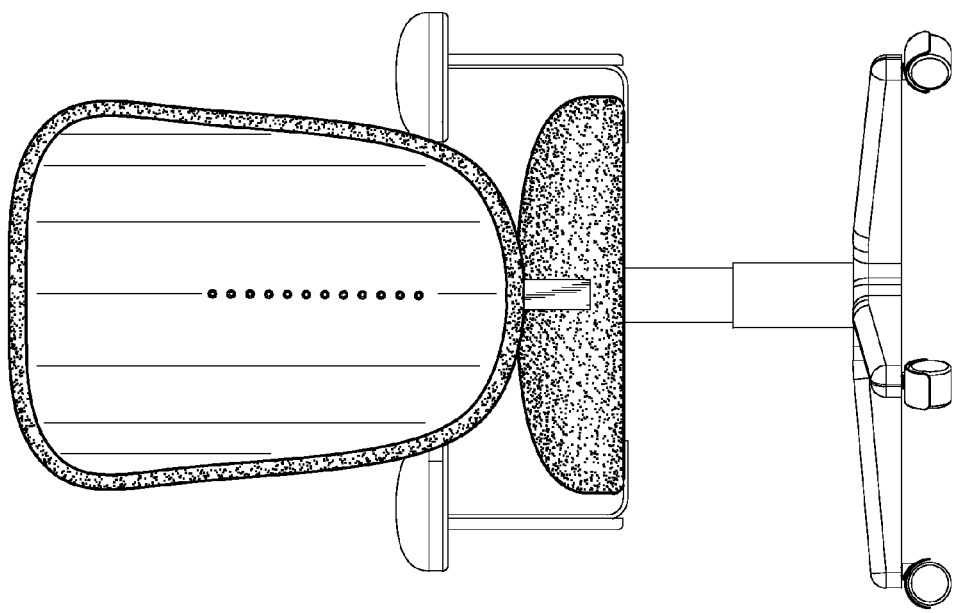
Figure 8:
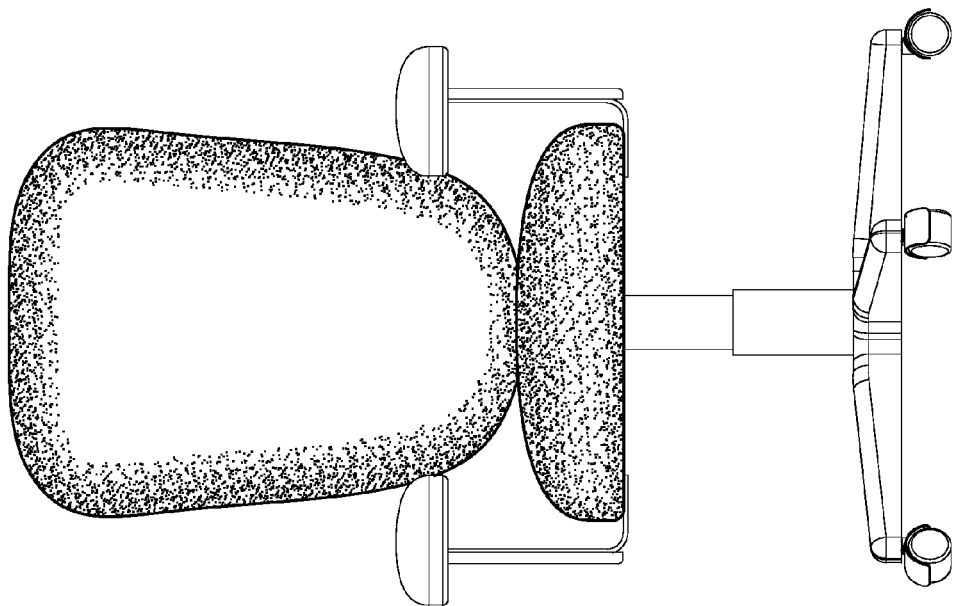
Figure 11:
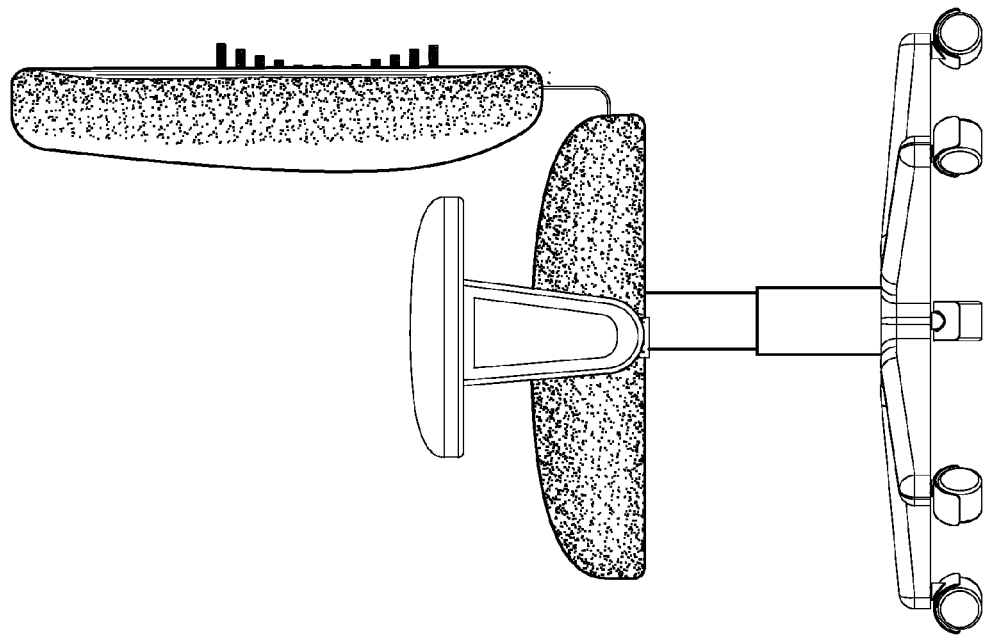
Figure 10:
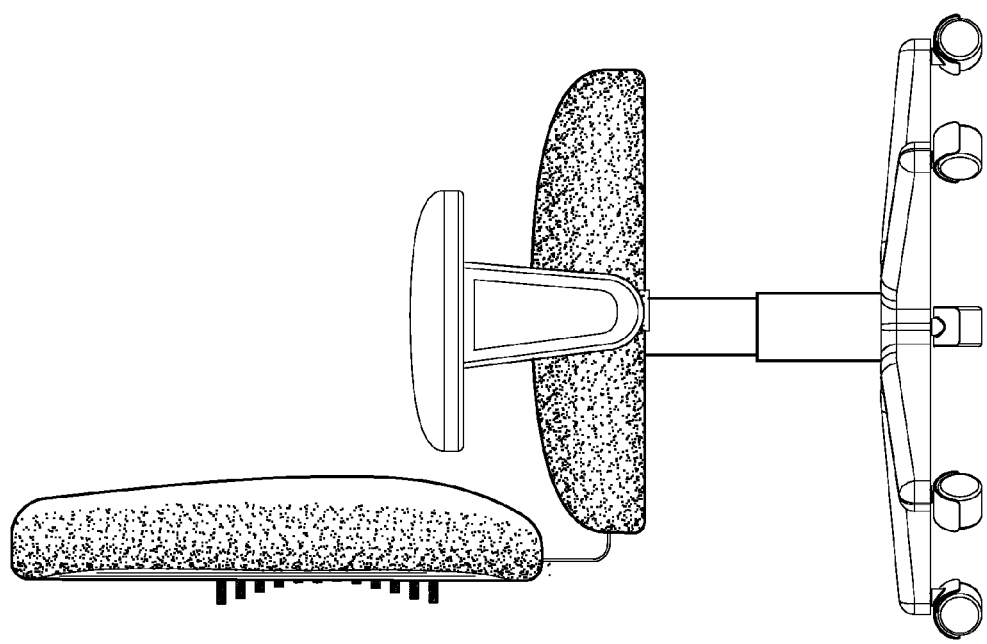
Figure 13:
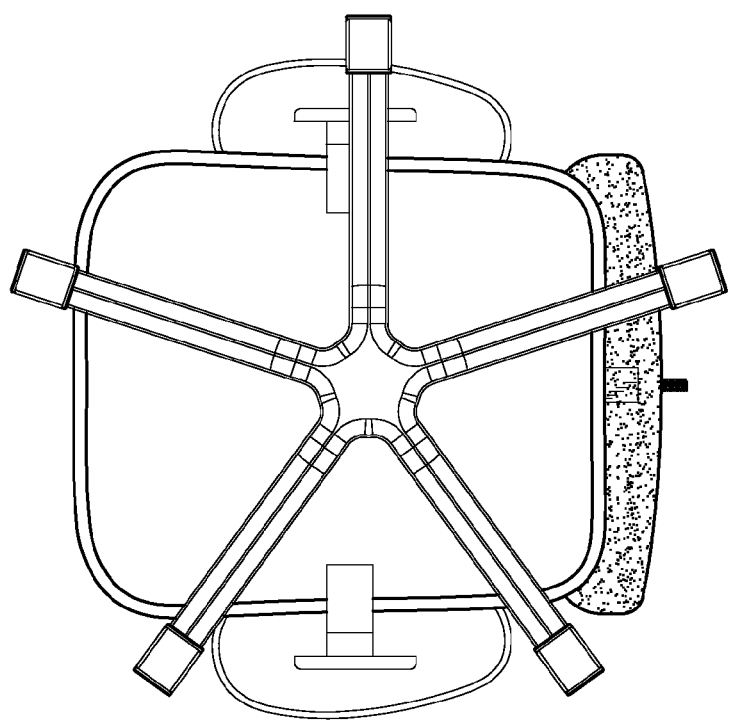
Figure 12:
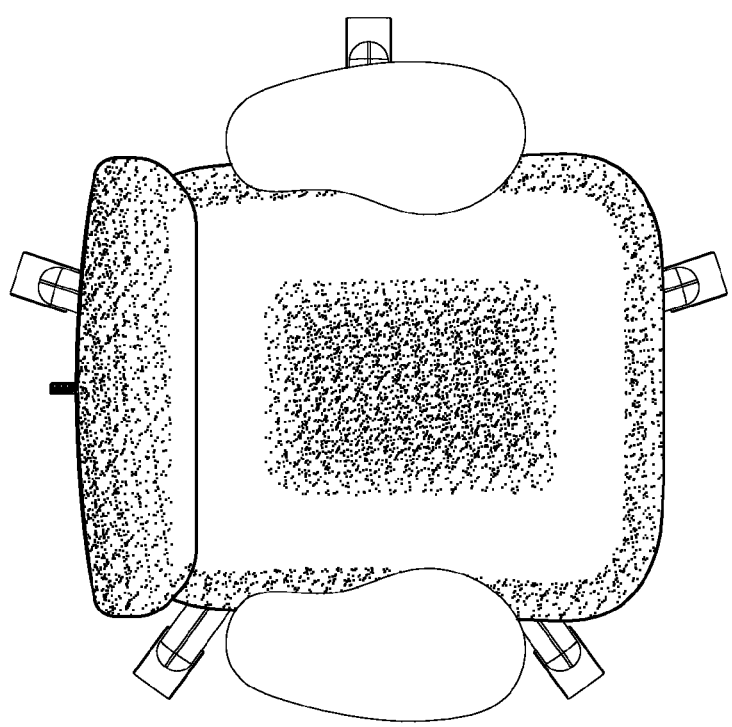

FIG. 6 shows how a user may be seated within chair 100 which has been customized to the user. For example, wings 118 within upholstered and padded backrest member 104 cradle the user's rib cage, armrests 122 are appropriately positioned height wise and spacing relative to seating member 102 so that the user's elbows are positioned at about 90° when resting on armrests 122, and the curvature provided by enclosed elongate band 110, as supported by screws 112, is customized to the needs of the particular user seated in chair 100. For example, the depth of the lumbar curve, its arc length, as well as its height relative to seat member 110 are all customized and easily adjusted through adjustment of screws 112 to properly support the back of the user.

Such proper support, and improvement of the user's posture has been shown in clinical testing by the present inventors to significantly reduce the incidence of nearly two dozen various issues that can be attributed to non-ideal posture. Posture improvement provided by use of the chair, as set up by a qualified technician or practitioner, reduces pain attributable to such root causes. Such treatment also reduces health care costs to the user, to an employer, and society as a whole as a result of reduced need for visits to chiropractors, physical therapists, and surgeries that can be avoided through posture improvement.

As shown in FIG. 6 a footrest 170 may be provided. Such a footrest may provide an incline of about 30°, to ensure the knees of the user are angled at about 60° (e.g., the upper leg relative to the lower leg is at about 60°), while the ankles of the user are angled at about 90° relative to the user's foot. As shown the elbows are at about 90° while the user 175 employs keyboard 172 and monitor 174.

Other factors surrounding the chair's use may also be addressed so as to achieve the desired results by providing follow up with the user by a trained technician (e.g., a physical therapist or other trained practitioner). For example, it may be important to ensure that the work space around the user is properly set up so that the benefits of use of the chair are achieved. For example, such environmental factors may include providing for appropriate desk height, appropriate computer keyboard and monitor placement, appropriate use of a copy stand, ensuring that the chair remains substantially stationary when a user leans back (e.g., employing stops on any wheels or ensuring that the chair is on a surface providing sufficient rolling resistance to prevent rolling of the chair when a footrest is used, etc.). Similarly, in at least some embodiments, finished backrest 105 of chair 100 may intentionally be configured so as to not recline, to ensure that the desired force vector is applied so as to improve the user's posture during use. If the chair does include a reclining feature, the reclining mechanism may be selectively locked for typical use to ensure application of the desired force vector.

The present invention may be embodied in other specific forms without departing from its spirit or essential characteristics. For example, one embodiment may include servo or other motors within chair 100 operatively coupled with screws 112. Thus, adjustment of screws 112 may be accomplished through such servo motors. Similarly, wings 118 may be operatively coupled to one or servo motors so as to allow adjustment of the positioning and/or orientation of wings 118 with such servo motors. Such a configuration may advantageously allow adjustment of internal components (e.g., wings 118) without requiring removal of finishing upholstery and padding material. Such embodiments are within the scope of the present disclosure.

IV. Portable Backrest Members

It may be desirable to provide the above described contour specifically tailored and customized to a given user in a chair that is already provided, e.g., a vehicle seat. Thus, another embodiment of the present invention is directed to portable backrest members that themselves may not be a chair, but are provided for use with a chair, to improve the back support provided by an already existing chair to be retrofitted with the portable backrest member. Such a backrest member may be provided as an insert, e.g., without any seat member, legs, etc. or other floor support, which is placed adjacent the rear of a seat member of an existing chair, against the backrest member of the existing chair, which already includes a backrest member (e.g., a backrest member that is integrated with the seat member of the chair).

The portable backrest member allows a user to take the backrest member with them, and place it between their back and the backrest member of the existing chair, so as to provide for improved back support to the user. Such a portable backrest member may provide many or all of the benefits described above relative to full solution office chair embodiments. In addition, selection and adjustment of the adjustable platform included within such a portable backrest member may be done in a similar manner, e.g., by taking anatomical measurements of the user's spinal region and other anatomical measurements. Once the user's spinal characteristics are known, the adjustable platform of the portable backrest member may be manipulated in a similar manner as described above, to provide the desired back support and posture corrective force vector to the user's back via the elongate band of the adjustable platform.

Figure 14:
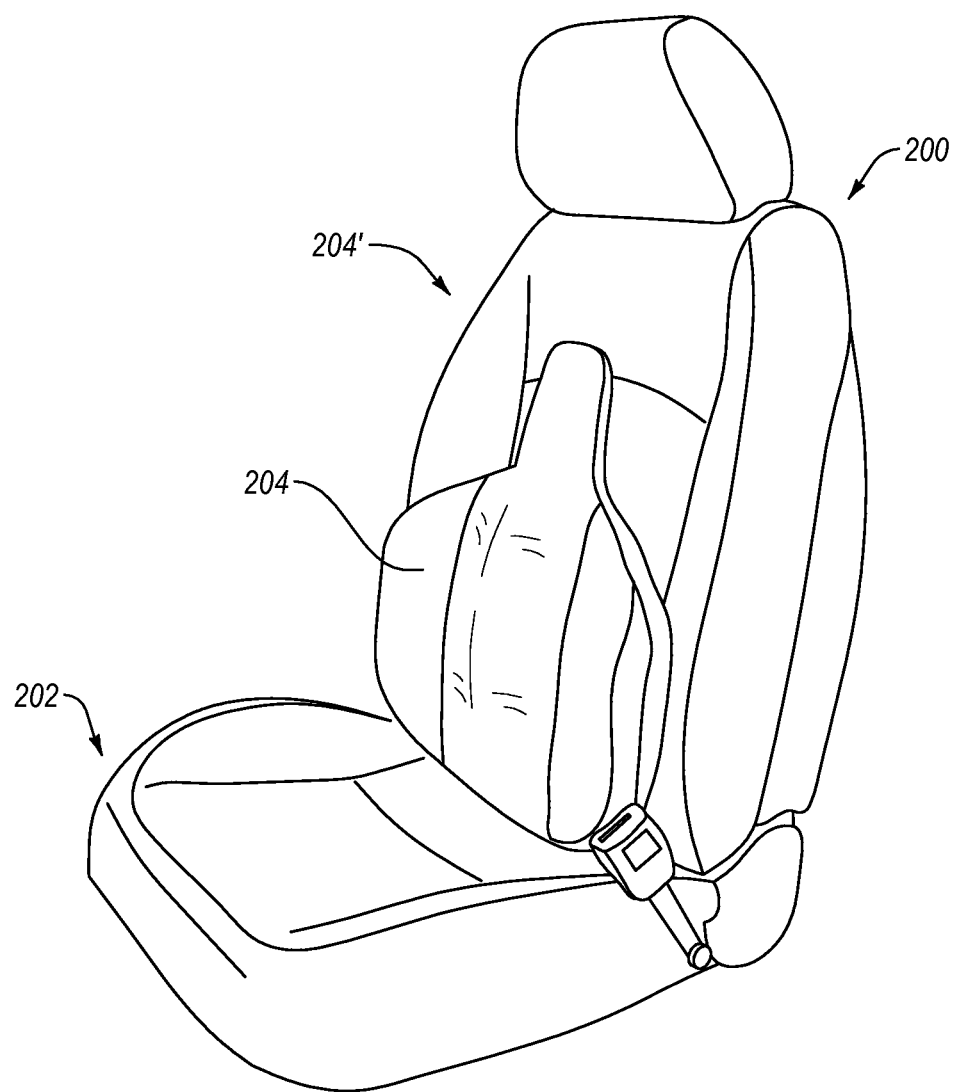
FIG. 14 shows a perspective view of an exemplary portable backrest member positioned adjacent a rear end of an exemplary vehicle seat, so that when a user sits in the vehicle seat with their back against the portable backrest member, the user is provided with a customizable contour provided by an adjustable platform of the portable backrest member to support the user's back.

FIGS. 14-18 illustrate exemplary embodiments of a portable backrest member 204 for use with a chair (e.g., a vehicle seat). Any of the features, alternatives, etc. described relative to the office chair embodiments may be incorporated into such a portable backrest member insert, as appropriate. Similarly, any of the features or embodiments described in the context of the portable backrest member 204 may similarly be employed in an office or other chair. For example, the adjustable platform where both opposed ends of the elongate band are slidably attached relative to the backrest member frame or substrate as shown in FIGS. 15-18 may be employed in a backrest member included as part of an integrated office chair such as that shown in FIGS. 1-13. FIG. 14 shows an existing vehicle seat 200 including a seat member 202 and an integrated backrest member 204', showing how the portable backrest member may be placed generally vertically, adjacent the rear of seat member 202, against backrest member 204 of chair 200. The backrest member 204 is specially configured to include an adjustable platform which provides a desired, customized contour for supporting the back of a user seated within chair 200.

Figure 15:
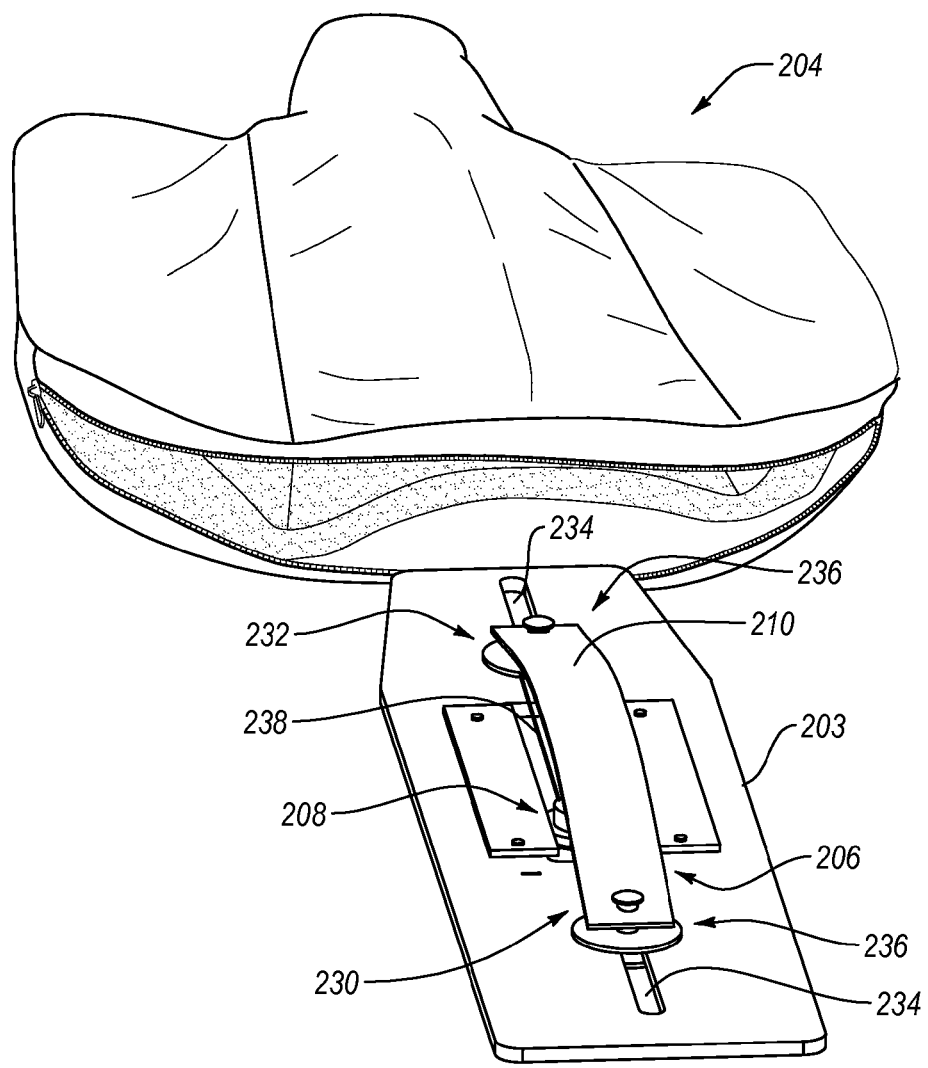
FIG. 15 shows an exploded perspective view of the exemplary portable backrest member, showing the adjustable platform and backrest substrate or frame on which the platform is mounted.
Figure 16:
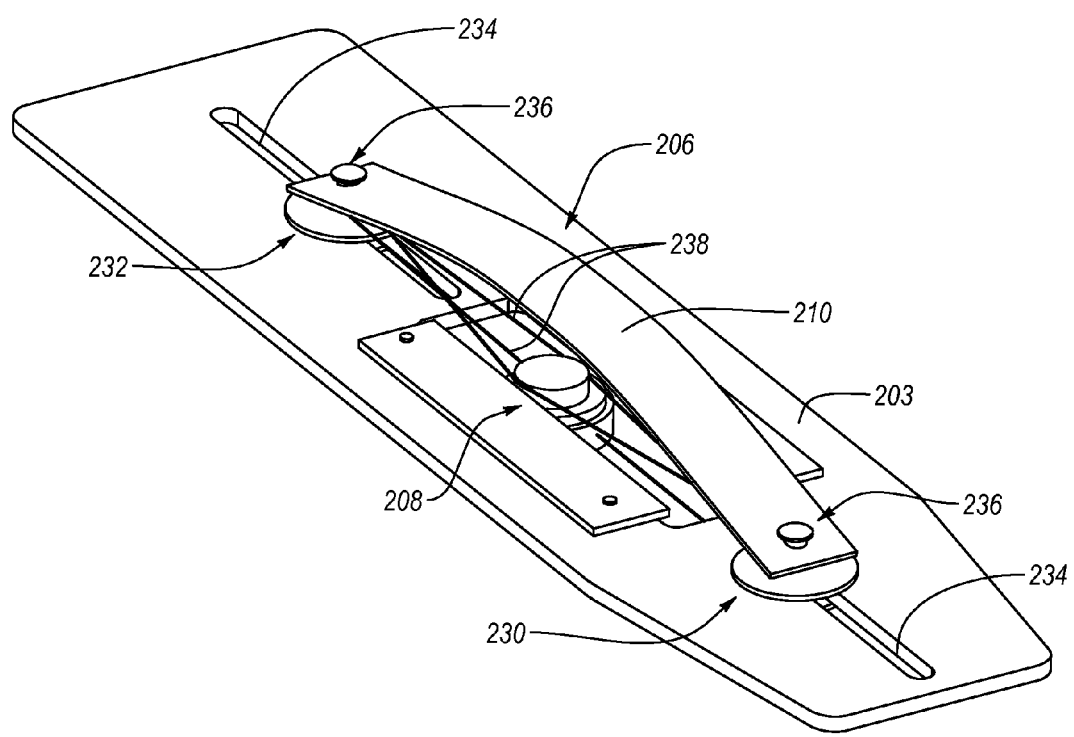
FIG. 16 shows a perspective view of the substrate or frame of the backrest member and its associated adjustable platform.
Figure 17:
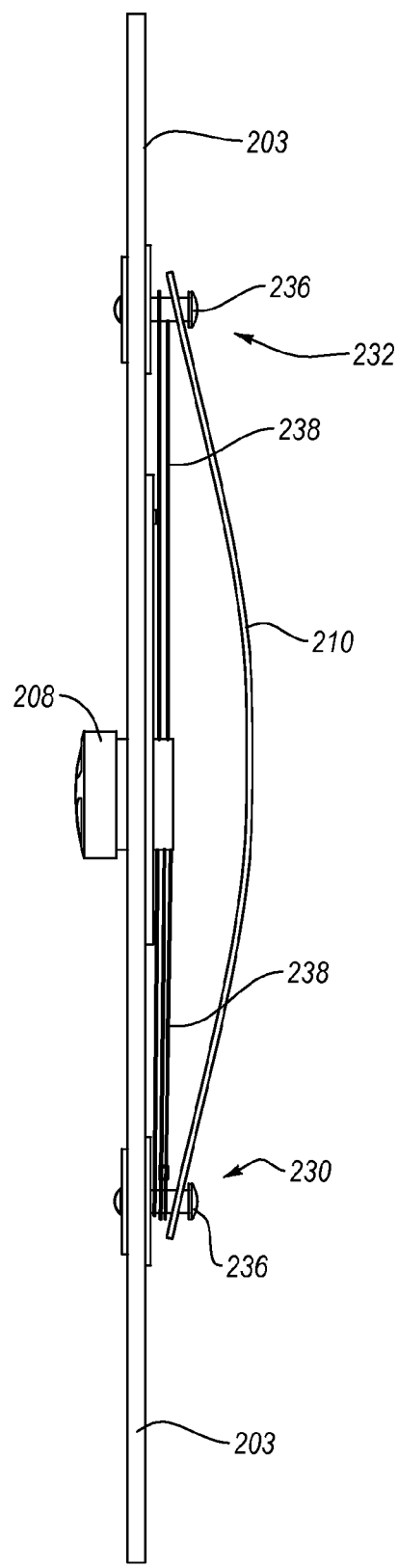
FIG. 17 shows a side view of the substrate or frame of the backrest member, and its associated adjustable platform.
Figure 18:
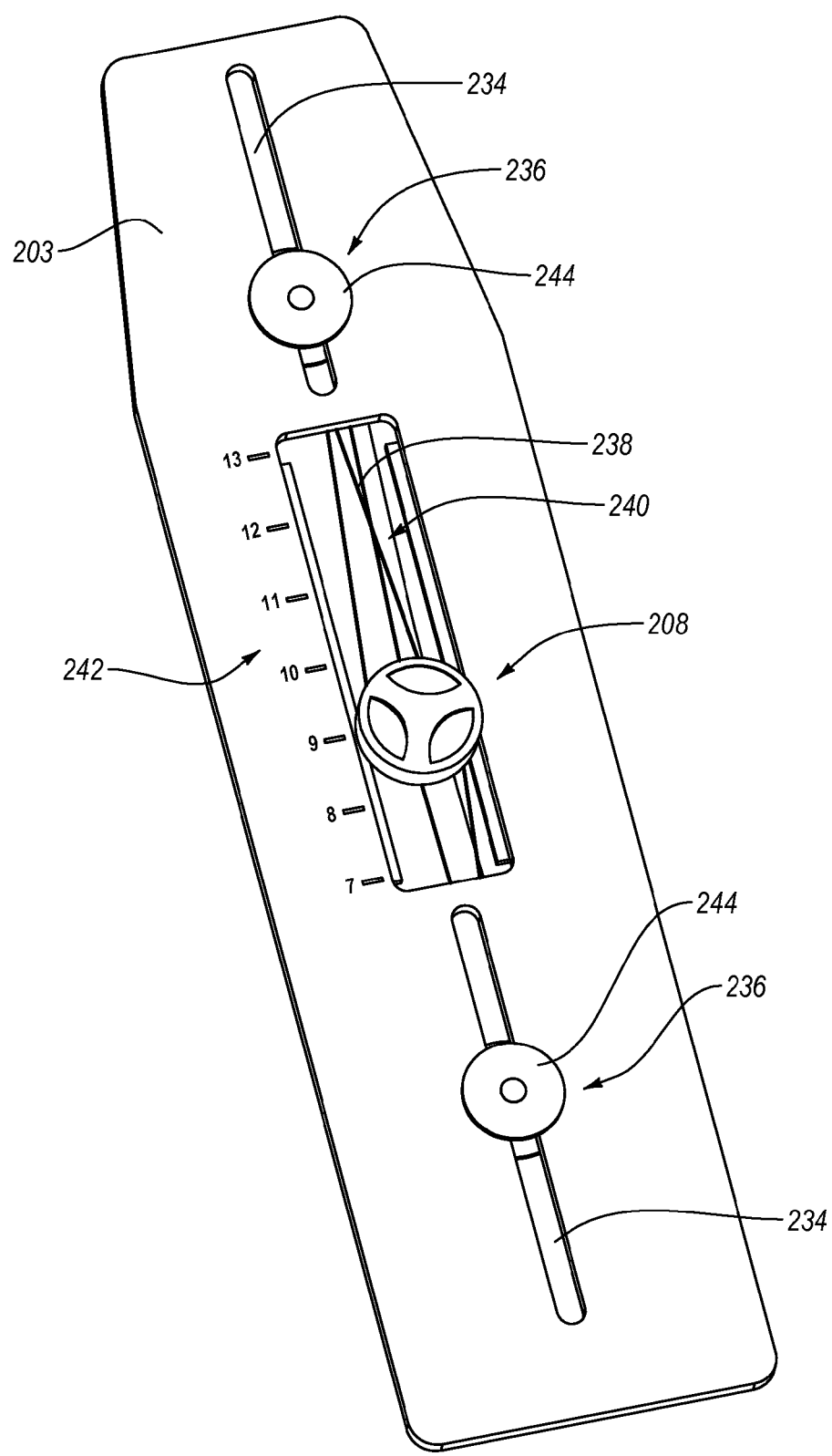
FIG. 18 shows another perspective view of the substrate or frame of the backrest member and adjustable platform of FIGS. 15-17, showing the rear portion that may be accessible at the rear of the portable backrest member.

FIG. 15 shows backrest member 204 in an exploded configuration, illustrating the frame or substrate 203 on which the adjustable platform 206 is mounted, which may be inserted into the upholstery and padding materials of backrest member 204. FIGS. 16-18 further illustrate the internal features of backrest member 204 which together provide the adjustable platform 206. Platform 206 may comprise an elongate band 210 attached to substrate 203, disposed along a central longitudinal axis of backrest member 204 and substrate 203. One end 230 (e.g., a lower end) of elongate band 210 may be attached to substrate 203, while opposite end 232 (e.g., an upper end) of band 210 may also be attached to substrate 203. Both ends 230 and 232 may be slidably attached relative to substrate 203, within respective elongate slots 234. Each end of band 210 may include a slidable anchor 236 attached thereto, with each slidable anchor 236 slidably disposed within slot 234. Because each anchor 236 is attached to an end of band 210, as a respective anchor is pulled (e.g., slid) to a desired location within corresponding slot 234, the ends 230, 232 of band 210 are drawn together to a desired degree, forcing band 210 to present a convexly curved contour against which the user's spinal region may rest during use, providing support and optionally a corrective force vector to the user's back, so as to support and/or improve back posture.

In order to draw the opposed ends 230, 232 of band 210 together, a cinching device (e.g., such as that commercially available from BOA Technologies, Denver, Colo.) or other adjustment mechanism 208 may be provided. Wires, cords, cables, or other similar elongate members 238 may be attached to both ends 230 and 232, with cinching device 208 disposed therebetween to selectively wind and unwind such members 238. The term cables or cable members may be used herein to broadly describe any such members 238. Winding of cable members 238 about a take up drum or similar mechanism within device 208 draws ends 230, 232 towards one another, forcing elongate band 210 to present a larger deflected curve, as the center portion of band 210 bends outward relative to substrate 203. As cable members 238 are let out, ends 230 and 232 of band 210 slide within slots 234 apart from one another, causing the deflected curve to collapse. This mechanism allows a user or practitioner who is setting up the portable backrest member for a user to select the appropriate depth of the curve or contour provided by adjustable platform 206 and elongate band 210.

Furthermore, the location of the height of the lumbar curve apex provided by elongate band 210 may be adjustable in its height above the seat member 202 by providing slots 234 within which band 210 is slidably anchored, as well as providing a slot 240 within which cinching device 208 may similarly slide. This is perhaps best shown in FIG. 18. As seen, the rear of substrate 203 may include indexed markings 242 to clearly indicate where cinching device 208 is centered relative to its height above seat member 202, which location may correspond to the apex of the lumbar curve provided by elongate band 210. While it may be possible to configure slots 234 and slot 240 as a single continuous slot, the illustrated embodiment illustrates three separate slots (two slots 234, one to receive each slidable anchor 236 associated with each end 230, 232, respectively), and a separate slot disposed therebetween within which cinching device 208 is slidably disposed. This allows the entire adjustable platform of elongate band 210, anchors 236, cinching device 208, and cable members 238 to slide up and down within the slots 234, 240 as a single unit, to position the lumbar curve apex at the desired height above the seat member 202, as dictated by the needs of the user. Slidability of ends 230 and 232 (through anchors 236 in slots 234) allows the depth of curvature of the lumbar curve to also be accommodated as dictated by the needs of the user.

Thus, an exemplary method may include determining the appropriate height of the apex of the lumbar curve above the seat member, positioning device 208 at that indexed position within slot 240 (e.g., by loosening anchored ends 236 within slots 234), and then adjusting mechanism 208 (e.g., by cinching) to draw ends 230, 232 towards one another so as to provide the desired depth to the provided lumbar curve defined by elongate band 210. Once the desired height and depth characteristics have been set, screws or similar fasteners of anchors 236 may be tightened (e.g., pinching associated washer(s) 244 of anchor 236 between substrate 203 and band 210, so as to prevent sliding of ends 230, 232 of band 210 within slots 234. Of course, other mechanisms for holding the selected height and depth characteristics may be apparent to those of skill in the art, and are within the scope of the invention.

The indexed markings 242 and adjustment mechanism 208 may be accessible at the rear of the portable backrest member 204, e.g., through being exposed through any upholstery/padding material, or being accessible through a zippered or similar access point at the rear of the portable backrest member 204.

As used in this specification and the appended claims, the singular forms "a," "an" and "the" include plural referents unless the context clearly dictates otherwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A backrest member for use with a seat member of a chair, the backrest member comprising:
    an adjustable platform attached to a substrate of the backrest member, the adjustable platform being selectively adjustable to provide a desired contour for supporting the back of a user seated within the chair; and
    an adjustment mechanism configured to adjust the adjustable platform along one or more locations of the platform to provide a desired contour for supporting the back of a user seated within the chair;
    wherein the adjustable platform comprises an elongate band attached to the substrate of the backrest member and disposed along a central longitudinal axis of the backrest member, one end of the elongate band being attached to the substrate of the backrest member and an opposite end of the elongate band being slidably attached relative to the substrate of the backrest member.

2. A backrest member as recited in claim 1, wherein the one end of the elongate band that is attached to the substrate of the backrest member is slidably attached to the substrate of the backrest member, such that both ends of the elongate band are slidably attached relative to the substrate of the backrest member.

3. A backrest member as recited in claim 1, further comprising upholstery padding material disposed over the substrate of the backrest member and the adjustable platform so that the adjustable platform is enclosed within the upholstered padding material.

4. A backrest member as recited in claim 3, wherein the adjustment mechanism for adjusting the adjustable platform is accessible at a rear surface of the upholstered backrest member to allow selective adjustment of the contour provided by the adjustable platform that is enclosed within the upholstered backrest member.

5. A backrest member as recited in claim 1, wherein the chair with which the backrest member is employed is a vehicle seat, the backrest member being placed adjacent a rear end of the seat member of the vehicle seat, against an integrated backrest member of the automobile chair during use so as to provide the vehicle seat with the desired contour for supporting the back of a user seated within the vehicle seat.

6. A method of providing a vehicle seat with a backrest member including an adjustable platform that is selectively adjustable to provide a desired contour for supporting the back of a user seated within the vehicle seat, the method comprising:
    providing an adjustable backrest member as recited in claim 1, the backrest member being a portable backrest member insert that is inserted between a back of a user and an integrated backrest member of the vehicle seat during use;
    positioning the adjustable backrest member adjacent a rear end of the seat member of the vehicle seat, against the integrated backrest member of the vehicle seat so as to provide the vehicle seat with the desired contour for supporting the back of a user seated within the vehicle seat.

7. A method as recited in claim 6, wherein the portable backrest member insert does not itself include an attached seat member.

8. A portable backrest member insert provided separate from a chair, but for use with a chair, so as to provide an adjustable platform configured to provide an improved, desired contour for supporting the back of a user seated within the chair, the portable backrest member insert comprising:

an adjustable platform attached to a substrate of the backrest member, the adjustable platform being selectively adjustable to provide a desired contour for supporting the back of a user seated within the chair; and an adjustment mechanism configured to adjust the adjustable platform along one or more locations of the platform to provide a desired contour for supporting the back of a user seated within the chair;

wherein the adjustable platform comprises an elongate band attached to the substrate of the backrest member and disposed along a central longitudinal axis of the backrest member, one end of the elongate band being slidably attached relative to the backrest member and an opposite end of the elongate band also being slidably attached relative to the backrest member, the elongate band presenting a curved surface providing the desired contour for supporting the back of a user seated against the portable backrest member insert as the two ends of the elongate band are slid towards or apart from one another to desired positions therefor.

9. A portable backrest member insert as recited in claim 8, wherein the substrate of the backrest member includes an elongate slot aligned with the elongate band, and wherein each end of the elongate band is slidably attached to the substrate of the backrest member through the slot by respective slidable anchors attached at an end of the elongate band, the slidable anchors being slidably disposed within the slot.

10. A portable backrest member insert as recited in claim 9, wherein two elongate slots aligned with the elongate band are provided, the slidable anchor associated with each end of the elongate band being slidably disposed within each slot.

11. A portable backrest member insert as recited in claim 8, wherein the adjustment mechanism configured to adjust the adjustable platform comprises a cinching device and one or more cables attached to the opposed ends of the elongate band so as to pull the ends of the elongate band towards one another as the one or more cables are wound within the cinching device.

12. A portable backrest member insert as recited in claim 11, further comprising a slot within the substrate within which the cinching device is slidably disposed to allow the adjustable platform and the adjustment mechanism to be slid up and down relative to the substrate.

13. A portable backrest member insert as recited in claim 12, further comprising upholstery padding material disposed over the substrate of the backrest member and the adjustable platform so that the adjustable platform is enclosed within the upholstered padding material.

14. A portable backrest member insert as recited in claim 13, wherein the cinching device for adjusting the adjustable platform is accessible at a rear surface of the upholstered backrest member.

15. A portable backrest member insert as recited in claim 14, further comprising indexed markings adjacent the slot within the substrate within which the cinching device is slidably disposed, the indexed markings corresponding to a height of an apex of a lumbar curve above the seat member provided by the elongate band of the adjustable platform.

* * * * *